(12) United States Patent
Camps

(10) Patent No.: US 9,700,923 B2
(45) Date of Patent: Jul. 11, 2017

(54) METHOD FOR OBTAINING A SOLID PRODUCT COMPRISING CREMATED ASHES AND A WAX IN A VESSEL, A PRODUCT OBTAINED BY MEANS OF THE METHOD AND A CASE CONTAINING SAID PRODUCT

(71) Applicant: THE OMNEO UNIVERSAL GROUP, S.L., Madrid (ES)

(72) Inventor: Quim Camps, Barcelona (ES)

(73) Assignee: THE OMNEO UNIVERSAL GROUP, S.L., Madrid (ES)

( * ) Notice: Subject to any disclaimer, the term of this patent is extended or adjusted under 35 U.S.C. 154(b) by 0 days.

(21) Appl. No.: 14/442,359

(22) PCT Filed: Jan. 13, 2015

(86) PCT No.: PCT/ES2015/070012
§ 371 (c)(1),
(2) Date: May 12, 2015

(87) PCT Pub. No.: WO2016/001460
PCT Pub. Date: Jan. 7, 2016

(65) Prior Publication Data
US 2016/0271660 A1 Sep. 22, 2016

(30) Foreign Application Priority Data
Jul. 4, 2014 (ES) .................................... 201431008

(51) Int. Cl.
| | | |
|---|---|---|
| B09B 3/00 | (2006.01) | |
| A61G 17/08 | (2006.01) | |
| B44C 5/00 | (2006.01) | |
| F23G 1/00 | (2006.01) | |
| A61G 17/007 | (2006.01) | |

(52) U.S. Cl.
CPC .......... *B09B 3/0025* (2013.01); *A61G 17/007* (2013.01); *A61G 17/08* (2013.01); *B44C 5/00* (2013.01); *F23G 1/00* (2013.01); *F23J 2900/01001* (2013.01); *F23J 2900/01003* (2013.01)

(58) Field of Classification Search
CPC .... B09B 3/0025; A61G 17/007; A61G 17/08; F23G 1/00; B44C 5/00; F23J 2900/01003; F23J 2900/01001
USPC ............... 27/1; 110/341, 194; 264/114, 122; 428/542.4
See application file for complete search history.

(56) References Cited

U.S. PATENT DOCUMENTS

| | | | | |
|---|---|---|---|---|
| 1,640,680 A * | 8/1927 | Vanderlaan | ............ | C04B 33/16 264/601 |
| 5,016,330 A * | 5/1991 | Botsch | .................. | E04H 13/008 27/1 |
| 5,813,098 A * | 9/1998 | Schneider | .............. | A61G 17/08 27/1 |
| 6,200,507 B1 * | 3/2001 | Dennis | .................... | A61G 17/08 264/112 |
| 6,382,111 B1 * | 5/2002 | Hojaji | ..................... | B09B 3/005 110/341 |
| 6,615,463 B1 * | 9/2003 | Hojaji | ..................... | B09B 3/005 110/341 |
| 6,665,916 B1 * | 12/2003 | Santorello | .............. | A61G 17/08 27/1 |
| 6,785,939 B1 * | 9/2004 | James | .................... | A61G 17/08 27/1 |
| 7,228,602 B2 * | 6/2007 | Weisbrot | ................ | A44C 17/00 264/234 |
| 7,255,743 B2 * | 8/2007 | VandenBiesen | ......... | B01J 3/065 117/104 |
| 7,266,866 B2 * | 9/2007 | Vogel | ..................... | B09B 3/005 110/341 |
| 8,627,555 B2 * | 1/2014 | Kennedy | ................ | A61G 17/08 27/1 |
| 8,959,731 B2 * | 2/2015 | Lynch | .................... | A61G 17/08 27/1 |
| 9,168,573 B2 * | 10/2015 | Hojaji | ....................... | B09B 3/00 |
| 9,233,045 B2 * | 1/2016 | Lynch | .................... | A61G 17/08 |
| 9,393,170 B2 * | 7/2016 | Savage | .................. | A61G 17/08 |
| 2002/0025392 A1 * | 2/2002 | Yardley | ..................... | C03B 1/00 428/3 |
| 2003/0154581 A1 * | 8/2003 | Jain | ........................ | A61G 17/08 27/1 |
| 2009/0077779 A1 * | 3/2009 | Zimmerman | .......... | A61G 17/08 27/1 |
| 2009/0266108 A1 * | 10/2009 | Balme | .................. | A44C 17/006 63/1.11 |
| 2010/0005835 A1 * | 1/2010 | Johnson, Sr. | ........ | A01K 61/002 63/36 |
| 2010/0199476 A1 * | 8/2010 | Cummings | ............ | A61G 17/08 27/1 |
| 2014/0013554 A1 * | 1/2014 | Hojaji | ...................... | B09B 3/00 27/1 |
| 2015/0209211 A1 * | 7/2015 | Savage | .................. | A61G 17/08 27/1 |

FOREIGN PATENT DOCUMENTS

| | | | | |
|---|---|---|---|---|
| FR | WO 2006103347 A1 * | 10/2006 | ............. | B09B 3/005 |
| GB | WO 2008074999 A1 * | 6/2008 | ............. | A61G 17/08 |
| GB | 2473419 A * | 3/2011 | ............. | A44C 25/00 |

* cited by examiner

*Primary Examiner* — William Miller

(57) ABSTRACT

The present invention reveals a method for obtaining a solid product comprising the cremated ashes of a human being or animal, inside a vessel, comprising the following steps: separating the ashes produced as a result of cremating a body, determining the ashes produced by the body itself and the ashes produced from other elements present during cremation; grinding the ashes produced from the separated human ashes; introducing the ashes and a wax composition into a vessel and closing the vessel with a lid; (iv) heating the vessel, subjecting it to centrifugation and cooling the vessel. It likewise discloses a solid product comprising cremated human or animal ashes inside a vessel, obtained as a result of the method and a case containing said solid product.

17 Claims, No Drawings

METHOD FOR OBTAINING A SOLID PRODUCT COMPRISING CREMATED ASHES AND A WAX IN A VESSEL, A PRODUCT OBTAINED BY MEANS OF THE METHOD AND A CASE CONTAINING SAID PRODUCT

FIELD OF THE INVENTION

The present invention relates to a method for obtaining a solid product, comprising the cremated ashes of a human or animal that has passed away and at least one wax. The solid product is obtained according to the invention method inside a vessel, forming an assembly which may in turn be housed inside a case. The invention also relates to said assembly made up of said solid product contained inside the vessel, with the case that in turn contains said assembly. Information on the deceased animal or person may be engraved on the case, the same being provided with identification means, for example a microchip.

BACKGROUND OF THE INVENTION

Cremation is an alternative method to burial and is increasingly preferred by the deceased and family members. The ashes produced as a result of cremating a loved one, whether human or animal, are traditionally introduced into and kept in urns. However, if the urn or another type of similar container containing the ashes is broken accidentally, the ashes are easily dispersed and it is almost impossible to recover them completely and once again introduce them into a new urn.

In order to resolve this problem, various solutions for preserving cremated ashes by forming a solid product comprising the same, which is introduced into an urn or similar container, have arisen in the state of the art, thus creating a solid, permanent memory of the loved one, whether human or animal.

One example of this includes patent application WO 2008/074999, which describes a process for forming a solid polymeric product comprising the ashes produced as a result of cremating a human or animal as a memory. This process comprises supplying the ashes, washing the same in a—preferably aqueous—means and more preferably in water and mixing the ashes washed with a polymerisation agent and/or melted polymer, placing the mixture into a mould until the polymeric product has been formed completely.

Patent application WO2006103347 relates to a method for conserving funeral ashes, characterised in that it consists of manufacturing a glass object with the ashes produced during the cremation of a human or animal.

U.S. Pat. No. 6,615,463 B1 describes obtaining a solid using the residual bones and ashes of a deceased person or animal with glass, ceramic, clay materials or by way of composites with organic matrices, metal matrices or cement matrices.

Despite the fact that various methods for conserving cremated ashes have been developed, by means of obtaining various solids that contain the same, the need to provide an alternative, simple method, of low economic cost, continues to exist within the state of the art, the same successfully managing to produce a new solid product, which is environmentally friendly and biodegradable, with the smallest dimensions possible, i.e. occupying the lowest volume possible. As such, it is possible to optimise the space needed to house the greatest number of bodies possible, minimising this space. This advantage responds to the current shortage of space and the increasing price thereof in cemeteries. In addition, the invention method likewise presents the additional, significant advantage of being standardised, which means that regardless of the size and weight of the body, the invention may be put into practice for the cremated remains of 99.9% of the population, thus obtaining a solid product comprising the cremated ashes of a deceased human being or animal and at least one wax, the same always being the same size. This standardisation furthermore makes it possible to manufacture the vessel, the case and the very solid product itself in series, thus reducing costs.

DESCRIPTION OF THE INVENTION

In a first aspect of the present invention, a method for forming a solid product containing the cremated ashes of a deceased human being or animal and at least one wax, inside a vessel, is referred to, this method comprising the following steps:
(i) separating the ashes produced as a result of cremating a deceased body into a) the ashes produced by the deceased body itself and b) the ashes produced by other elements present during cremation;
(ii) grinding the ashes produced by the human body, separated in the previous step;
(iii) introducing the ground ashes and a compound comprising at least one wax in a vessel and closing the vessel with a lid;
(iv) heating the vessel and subjecting it to centrifugation; and
(v) cooling the vessel.

The invention method firstly comprises supplying the cremated ashes of a body, whether human or animal, for example a pet. The ashes are separated in the first step, generally by means of sieving, in order to separate the bulkiest portion thereof, which comes from bone material and typically constitutes 90% by weight of the total weight of the ashes, from a finer dust, which constitutes the remaining 10% by weight and comes from other elements present during cremation, such as traces of different metal salts, some of which come from the casket itself, from a potential prosthesis, ferrous remains that the body itself has accumulated throughout life or impurities from the cremation furnace. The sieve used typically has a 0.2 mm×0.2 mm mesh size; the bulky ashes produced from bone material are retained in the upper portion, whilst the finer dust passes through and is disposed of, given that it does not constitute human or animal remains.

The ashes produced from bone, which are bulkier and have been separated, are then ground using conventional mechanical means, such as a blade mill, roller mill or ball mill. The ashes are ground as much as possible by this mechanical means, a fine dust being obtained, the particle size of which is the minimum that may be obtained by said mechanical means. In this step, the initial volume of ashes is successfully reduced to approximately 62-64%; the grain size of the ashes is reduced and as such, the density therefore increases.

The ground ashes are introduced into a vessel provided with at least one perforation, in order to be able to introduce the same and a composition comprising at least one wax is likewise introduced. One advantage of the present invention consists in the fact that it is possible to mix these components when dry. In a specific embodiment, this step is carried out by firstly weighing the ground ashes and calculating and weighing the corresponding amount of composition comprising at least one wax needed, in order to fill the vessel used as much as possible, i.e. fully.

The vessel may, a priori, be of any size. Nevertheless, in a preferred embodiment of the present invention, the same has an external volume and internal volume calculated and optimised such that both the solid product and the assembly of solid product and vessel occupy the least volume and space possible. Therefore, in a more preferred embodiment, the vessel has an internal volume of 1597 cm$^3$, which was calculated in order to be able to put the invention method into practice with 99.9% of the population.

The proportion of ground ash and composition comprising at least one wax (hereinafter also referred to as the wax composition) introduced, in each case depends on the weight of the ashes. As already mentioned, the ashes are weighed and the amount of composition is calculated according to said weight and the internal capacity of the vessel.

An optimised vessel volume of 1597 cm$^3$ thus makes it possible to put the invention method into practice with 99.9% of the population, the amount of wax composition added in order to obtain the solid product constituting 15% by weight, the remaining 85% being the ground cremated ashes. If a human being were to generate more cremated ashes than the average amount, the vessel may be made larger or, if one wishes to maintain the optimised measurements, it would be possible to reduce the percentage of wax. Furthermore, if the weight of the ashes is reduced as a result of coming from a smaller body or if said body simply generates fewer cremated ashes, for example as a result of decalcification, the amount of wax composition increases on top of the 15%, thus maintaining the optimised vessel volume. The maximum amount of wax composition that may be used in the invention method would be the amount needed in the event of the smallest possible human or animal body, for example a foetus, in the case of humans.

The wax composition comprises at least one wax. The wax that may be used in the invention method may, a priori, come from any source, whether vegetable, animal, synthetic, mineral or petroleum. In a specific embodiment, a vegetable wax is chosen, which is preferably biodegradable and low-cost, for example carnauba wax. This wax is obtained from the palm leaves and additionally presents the advantage of having a high fusion point of between 78° C. and 85° C., the highest of all natural waxes. In a specific embodiment, the composition may contain a mixture of 2 or more waxes.

The wax composition may additionally contain additives. Examples of additives include stearic acid and pigments. Such additives may typically be present in the composition in amounts of up to 15%, 10%, 5% or less than 5%. The pigment or pigments may be used to modify the natural colour otherwise obtained from the solid product. They may add shine or create a polished appearance. Thus, in a specific embodiment, the pigment is titanium oxide (white). Stearic acid is an additive that makes the solid hard, shiny and resistant.

The vessel with the ground ashes and the composition is then closed, completely isolating the contents thereof from the outside. As such, the vessel provided with at least one hole or perforation is closed hermetically, by means of placing a lid designed for such an end.

The mixture of ground ashes and composition is submitted to centrifugation and heated at a temperature greater than or equal to the fusion temperature of the wax. Said temperature typically ranges from 60° C. to 120° C. This step may be carried out in a furnace provided with centrifugation means, for example. Throughout this step, the mixture is homogenised and melted and the space inside the vessel is filled completely, as well as the spaces between the ash particles, thus minimising the space occupied by the mixture, without leaving hollows or air pockets as a result.

In step (v), the vessel is subsequently left to cool until it reaches room temperature, a solid product containing the cremated ashes of a body inside a closed vessel thus being obtained. This assembly constitutes a solid block, as though it were one single piece rather than two, in such a way that the solid product fits perfectly inside, is not displaced, does not move inside or create bothersome noises.

This solid product obtained directly as a result of the method of the present invention, containing the cremated ashes of a body alongside a composition comprising a wax inside a closed vessel, constitutes an additional aspect of the present invention. The advantages of the solid product, amongst others already mentioned, include the stability, biodegradability, non-toxicity and odourless quality thereof, in addition to the fact that it does not release gasses.

As for the vessel that may be used in the present invention, in addition to that already mentioned, the same may be made of any kind of material, provided that it is inert to the invention method, i.e. that it is not degraded during the same nor does it react with the components in any way. In a specific embodiment, this material is a metal, for example a noble metal such as gold, silver, alloys of the same or other metals, a ceramic material, stainless steel, a bound compound stone material, such as those materials obtained from a polymer and inorganic filler materials, such as minerals, quartz, etc. In a preferred embodiment, the polymer is an acrylate and the material is commercially available under the name Pral® Solid Surface (ABET LAMINATI).

The vessel may take on different forms. In a specific embodiment, it takes on the form of a parallelepiped box and has a hole, which may be circular in shape, for example, made in one of the faces thereof, preferably the upper face, there being a corresponding lid designed to fit perfectly into the hole. In a more preferred embodiment, the parallelepiped vessel has an internal volume of 1597 cm$^3$, its walls all measuring 1 mm in thickness and the external dimensions thereof being 316 mm×75 mm×75 mm. The vessel, which may furthermore be provided with identification means, is described in more detail below.

The lid may comprise a portion that is introduced into the solid product in order to retain the same. For example, the lid may be provided with a perforated tab or hook, designed to be mixed with the composition and ash solid. As such, the composition and ash mixture may be placed inside the vessel, the lid may then be placed and the mixture melted and cooled, thus meaning that said portion remains inside the solid product. It is therefore impossible to remove the lid, since said portion is embedded within.

The invention method also considers the possibility of dividing the ground cremated ash and wax composition mixture into various parts and thus filling more than one vessel. The total of the internal volumes of two or more vessels would add up to the total volume of the 1597 cm$^3$ vessel. This corresponds to the case of reliquaries, so that more than one family member may keep a portion of the ashes pertaining to the deceased animal or person and the same may be divided up, such that two or more solid products are obtained in the corresponding two or more vessels.

Furthermore, the method optionally comprises engraving information on the vessel and/or case using any means, for example by means of a laser, using a piece of equipment for such an end. As such, information on the deceased person or animal may be engraved permanently, preferably on the vessel.

Furthermore, if one should so desire, the vessel may be provided with means for identifying the deceased person or animal to be housed therein. This may be carried out at the beginning or at the end. As such, in a specific embodiment, the vessel is firstly provided with said identification means, in order to subsequently be filled in step (iii). As such, the identification means is built into the vessel assembly containing the ashes and the risk of the element becoming separated from the ashes, as a result of a mistake, for example, is reduced. This guarantees that the ashes can always be identified properly, which serves to make consumers feel more secure, for example a family member of somebody who has passed away or the owner of an animal that has passed on. Said means may be any of those described below.

This closed vessel containing the solid product may in turn be introduced into a case. The case may furthermore be designed to be displayed inside, thus constituting a unique, personalised and permanent memory of the person or animal that passed away. The case may be made from practically any material. In a specific embodiment, steel is used. In a preferred embodiment, it is parallelepiped in shape and measures 330 mm×93 mm×93 mm. This preferred case may suitably house the vessel described above, measuring 316 mm×75 mm×75 mm. The case that includes the vessel with the solid constitutes an additional aspect of the present invention. Using a separate outer case makes it possible for the same to be replaced by another one or, in the event of deterioration of its characteristics, such as breakage or imperfections or in the event of one wishing to adapt the case to a new environment, for example in terms of materials and colours.

In a particular embodiment, the outer case has a collapsible lid. This may serve to facilitate the replacement of the outer case. It may also serve to reuse the outer case, for example, for housing the ashes of another person or animal who passed away more recently.

Relative to the identification means mentioned above, any conventional means whatsoever, in addition to the microchip, may be used to such an end.

As such, in a specific embodiment, the identification means comprise an electronic identification element. This facilitates identification, since it is possible to read the identity electronically. For example, a code may be stored on the electronic identification element, which, upon being read and introduced into a computer system, may facilitate access to a database and/or a website, which may include a family tree and/or other information related to the person or animal to whom the ashes belong.

In a preferred embodiment, the identification means constitute a microchip, which is preferably built into the vessel to be used in the method, to which identity is given at the end of the method.

In another specific embodiment, the electronic identification element comprises a radiofrequency identification element (RFID). In another specific embodiment, the electronic identification element comprises a near field communication (NFC) element.

In other words, the identification element may be a simple RFID label, which means that reading the identifying information, such as an identification code, may be carried out with commercial RFID readers or similar.

In another specific embodiment, the electronic identification element is a passive element, for example a passive RFID label, it being possible for said passive element to be read by an external reader, without any internal energy source being required, for example, without the need for a battery.

The invention method guarantees that the ashes and composition adapt perfectly to the geometry of the vessel and fill it completely, in such a way that once the solid object has been obtained, the risk of the solid being able to move inside and cause bothersome noises when handling the vessel is eliminated.

In another particular embodiment, the identification means comprise an alpha-numerical code, which can be seen on the surface of the device. As such, the code may be read by a scanner using an OCR (optical character recognition) system, for example. This may be an alternative to or complement to the use of an electronic identification element.

In order to complement the description and with the aim of facilitating a better understanding of the invention characteristics, examples are described below, which should by no means be understood to limit the scope of the present invention.

EXAMPLES

According to a specific exemplary embodiment of the invention method, 2,800 grams of cremated ashes were taken and sieved with a sieve, the mesh size of which was 0.2 mm×0.2 mm. The bulky ashes retained in the sieve were ground with a conventional blade mill. A weight 10% lesser than the original value was obtained.

The weight of wax composition needed was then calculated at 15%. Said composition comprised carnauba wax.

The amounts were introduced into a 316 mm×75 mm×75 mm vessel, provided with an NFC microchip and an internal volume of 1597.57 cm$^3$. The vessel was closed hermetically by placing a lid in the hole. The vessel was heated at 120° C. and was submitted to centrifugation. It was then left to cool, identity was added to the microchip, it was engraved using a laser and finally introduced into a case.

In this document, the word "comprises" and variations thereof (for example "comprising", etc.) should not be understood to be exclusive. In other words, they do not exclude the possibility of that described including other elements or steps, etc.

Moreover, the invention is not limited to the specific embodiments described but rather also spans variations that may be carried out by one skilled in the art (for example, in terms of the choice of materials, dimensions, components, configuration, etc.) within that deduced from the claims.

The invention claimed is:

1. The method for obtaining a solid product with cremated ashes, inside a vessel comprising the following steps:
    (i) separating the ashes produced as a result of cremating a deceased human body into a) the ashes produced by the deceased body itself and b) the ashes produced by other elements present during cremation;
    (ii) grinding the ashes produced by the human body, separated in step (i);
    (iii) introducing the ground ashes and a composition comprising at least one wax into the vessel and closing the vessel with a lid;
    (iv) heating and subjecting the vessel to centrifugation; and
    (v) cooling the vessel.

2. The method according to claim 1, wherein step (i) of separating the ashes is carried out with a sieve, with a mesh size of 0.2 mm×0.2 mm.

3. The method according to claim 1, wherein the ashes produced by the human body are ground by mechanical means, until the initial volume of ashes is reduced by 62-64%.

4. The method according to claim 1, wherein the amount of wax composition introduced into the vessel is 15% or more and the remainder up to 100% constitutes the ground ashes.

5. The method according to claim 4, wherein the wax composition comprises carnauba wax.

6. The method according to claim 5, wherein the wax composition comprises one or more additives.

7. The method according to claim 1, wherein in step (iv), the vessel is heated to a temperature of between 60° C. and 120° C.

8. The method according to claim 1, further comprising engraving the vessel.

9. The method according to claim 8, wherein the engraving is made by means of a laser.

10. The method according to claim 1, wherein the vessel comprises identification means, for identifying the deceased body.

11. The solid product according to claim 1, wherein the solid product is formed inside the vessel.

12. The solid product according to claim 11, which has an internal volume of 1597 $cm^3$ and external dimensions of 316 mm×75 mm×75 mm.

13. The solid product according to claim 11, presenting identification means on the vessel.

14. The solid product according to claim 13, wherein the vessel has been engraved.

15. The solid product according to claim 11 wherein a case contains the solid product.

16. The solid product according to claim 15, wherein the case is manufactured from a compound acrylate polymeric material and natural minerals.

17. The solid product according to claim 15, wherein the case has external dimensions of 330 mm×93 mm×93 mm.

* * * * *